(12) United States Patent
Kudo

(10) Patent No.: US 11,664,049 B2
(45) Date of Patent: *May 30, 2023

(54) DISK DEVICE WITH IMPROVED IMPACT RESISTANCE

(71) Applicants: Kabushiki Kaisha Toshiba, Tokyo (JP); Toshiba Electronic Devices & Storage Corporation, Tokyo (JP)

(72) Inventor: Masaya Kudo, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,174

(22) Filed: Feb. 14, 2022

(65) Prior Publication Data

US 2022/0172741 A1 Jun. 2, 2022

Related U.S. Application Data

(63) Continuation of application No. 17/007,012, filed on Aug. 31, 2020, now Pat. No. 11,282,539.

(30) Foreign Application Priority Data

Mar. 16, 2020 (JP) .............................. JP2020-044975

(51) Int. Cl.
*G11B 5/48* (2006.01)
*G11B 5/60* (2006.01)
(Continued)

(52) U.S. Cl.
CPC ............ *G11B 5/6088* (2013.01); *G11B 5/314* (2013.01); *G11B 5/4833* (2013.01); *G11B 5/105* (2013.01);
(Continued)

(58) Field of Classification Search
None
See application file for complete search history.

(56) References Cited

U.S. PATENT DOCUMENTS 5,367,419 A * 11/1994 Kazama ............... G11B 5/4826
360/245.7
6,172,853 B1 1/2001 Davis et al.
(Continued)

FOREIGN PATENT DOCUMENTS

CN 104575525 A 4/2015

*Primary Examiner* — Craig A. Renner
(74) *Attorney, Agent, or Firm* — Allen & Overy LLP

(57) ABSTRACT

According to one embodiment, a disk device includes a magnetic disk, a load beam, a flexure, a head unit, and a first restrictor. The load beam has a first face facing the magnetic disk. The flexure is attached to the first face. The head unit includes: a magnetic head attached to the flexure, configured to read and write information from and to the magnetic disk; and a heat-assister attached to the magnetic head, configured to heat the magnetic disk. The first restrictor is included in the head unit, configured to come in contact with at least one of the load beam and the flexure along with movement of the magnetic head away from the first face by a first distance.

15 Claims, 13 Drawing Sheets

(51) Int. Cl.
  *G11B 5/31* (2006.01)
  *G11B 5/00* (2006.01)
  *G11B 5/105* (2006.01)

(52) U.S. Cl.
  CPC .... *G11B 5/4866* (2013.01); *G11B 2005/0021* (2013.01)

(56) References Cited

U.S. PATENT DOCUMENTS

| | | |
|---|---|---|
| 8,614,933 B2 | 12/2013 | Schreck et al. |
| 9,087,536 B2 | 7/2015 | Yamada |
| 9,805,749 B1 | 10/2017 | Lee et al. |
| 11,282,539 B2 * | 3/2022 | Kudo ............... G11B 5/6088 |
| 2004/0032695 A1 * | 2/2004 | Sassine et al. ....... G11B 5/4826 360/245.7 |
| 2007/0139818 A1 | 6/2007 | Shimazawa et al. |
| 2007/0230058 A1 | 10/2007 | Muraki et al. |
| 2009/0154022 A1 | 6/2009 | Takikawa |
| 2012/0182844 A1 | 7/2012 | Schreck et al. |
| 2013/0215726 A1 | 8/2013 | Fujimura et al. |
| 2013/0322221 A1 | 12/2013 | Naniwa et al. |
| 2015/0117167 A1 | 4/2015 | Yamada |
| 2015/0187376 A1 | 7/2015 | Miller et al. |
| 2017/0330589 A1 | 11/2017 | Bjorstrom et al. |

* cited by examiner

DISK DEVICE WITH IMPROVED IMPACT RESISTANCE

CROSS-REFERENCE TO RELATED APPLICATIONS

This application is a continuation of U.S. application Ser. No. 17/007,012 filed on Aug. 31, 2020 and is based upon and claims the benefit of priority from Japanese Patent Application No. 2020-044975, filed on Mar. 16, 2020; the entire contents of which are incorporated herein by reference.

FIELD

Embodiments described herein relate generally to a disk device.

BACKGROUND

Disk devices are known, which read and write information from and to a magnetic disk by heat assisted magnetic recording (HAMR). Such a HAMR disk device includes a magnetic head to which a laser diode is attached, for example.

The magnetic head increases in mass due to the attached laser diode. This may cause the magnetic head to easily vibrate, for example, when the disk device receives an impact.

DETAILED DESCRIPTION

According to one embodiment, a disk device includes a magnetic disk, a load beam, a flexure, a head unit, and a first restrictor. The load beam has a first face facing the magnetic disk. The flexure is attached to the first face. The head unit includes: a magnetic head attached to the flexure, configured to read and write information from and to the magnetic disk; and a heat-assister attached to the magnetic head, configured to heat the magnetic disk. The first restrictor is included in the head unit, configured to come in contact with at least one of the load beam and the flexure along with movement of the magnetic head away from the first face by a first distance.

First Embodiment

Hereinafter, a first embodiment will be described with reference to FIGS. 1 to 7. In the present specification, constituent elements of an embodiment may be represented by different expressions and be given different explanations. Such constituent elements and their descriptions are presented for illustrative purpose only and are not intended to limit the scope of the present invention. Constituent elements can also be identified by different names from those used in the present specification. Moreover, constituent elements can be described in different terms from the terms used in the present specification.

Figure 1:
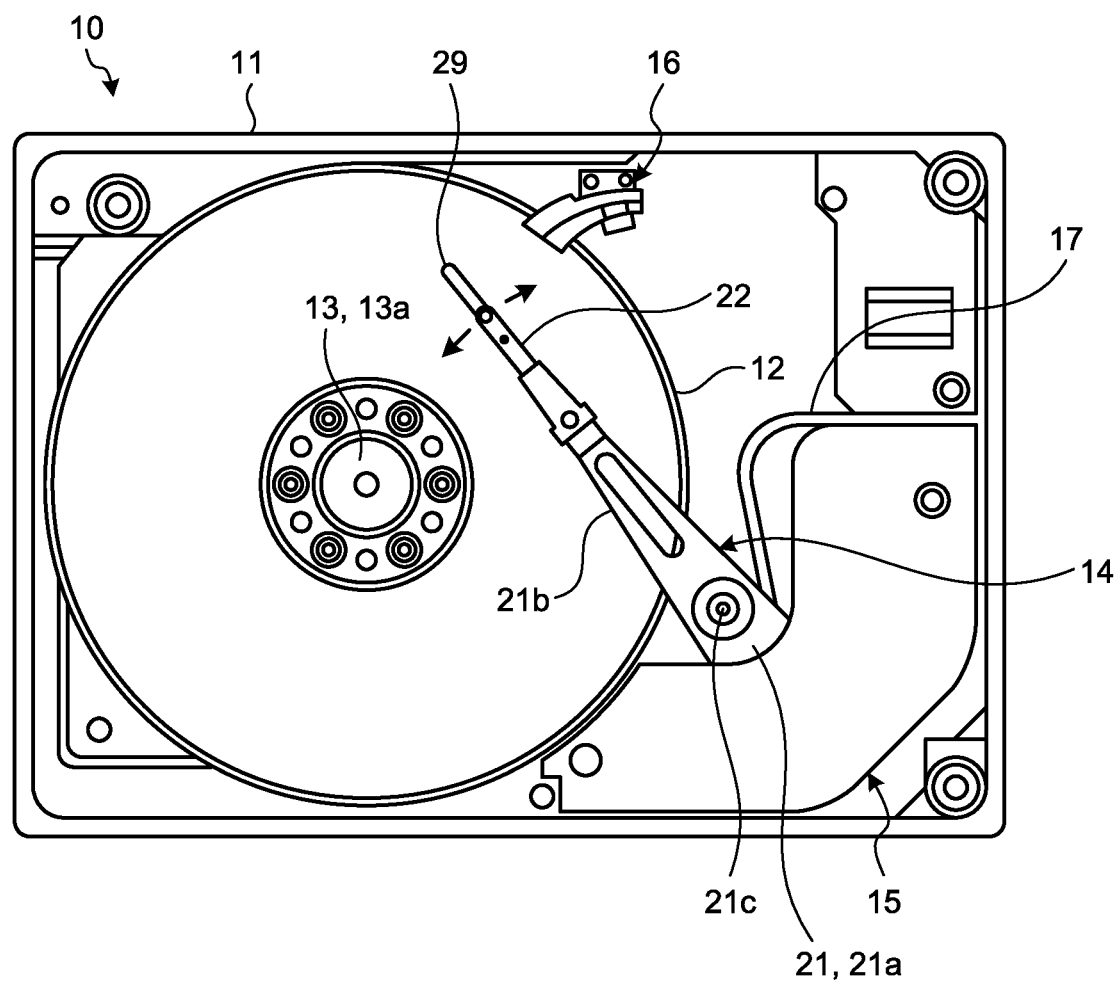
FIG. 1 is a plan view schematically illustrating a hard disk drive (HDD) according to a first embodiment.

FIG. 1 is a plan view schematically illustrating a hard disk drive (HDD) 10 according to the first embodiment. The HDD 10 is an example of a disk device. The disk device may be another device such as a hybrid HDD.

As illustrated in FIG. 1, the HDD 10 includes a housing 11, a plurality of magnetic disks 12, a spindle motor 13, a plurality of actuator assemblies 14, a voice coil motor (VCM) 15, a ramp load mechanism 16, and a flexible printed wiring board (FPC) 17. FIG. 1 illustrates one magnetic disk 12 and one actuator assembly 14. The magnetic disk 12 may also be referred to as a recording medium.

The housing 11 is formed of a metal such as an aluminum alloy, for example. The housing 11 is sealed by a lid, for example, and is filled with a gas such as helium. For the sake of explanation, FIG. 1 illustrates the housing 11 in an opened state. The housing 11 houses the magnetic disk 12, the spindle motor 13, the actuator assembly 14, the VCM 15, the ramp load mechanism 16, and the FPC 17.

The magnetic disk 12 magnetically records information, applied with a magnetic field carrying the information. The magnetic disks 12 are placed on the top of each other with spacing, and rotated by the spindle motor 13 about a rotational shaft 13a.

The actuator assembly 14 includes a carriage 21 and a plurality of head gimbal assemblies (HGA) 22. The HGA 22 may also be referred to as a head suspension assembly.

The carriage 21 includes an actuator block 21a and a plurality of carriage arms 21b. The actuator block 21a is driven by the VCM 15 and pivots about an arm shaft 21c that is substantially parallel to the rotational shaft 13a. The plurality of carriage arms 21b is arranged with spacing and extends from the actuator block 21a in substantially the same direction. The carriage arms 21b have a plate shape that can enter in-between the adjacent magnetic disks 12.

Along with the rotation of the actuator block 21a, the carriage arms 21b move along the surface of the magnetic disk 12. In this manner, the carriage 21 is movable relative to the magnetic disk 12.

The HGAs 22 are attached to the tip ends of the corresponding carriage arms 21b and protrude from the carriage arms 21b. The HGAs 22 are thus disposed with spacing in the arrangement direction of the magnetic disks 12.

Figure 2:
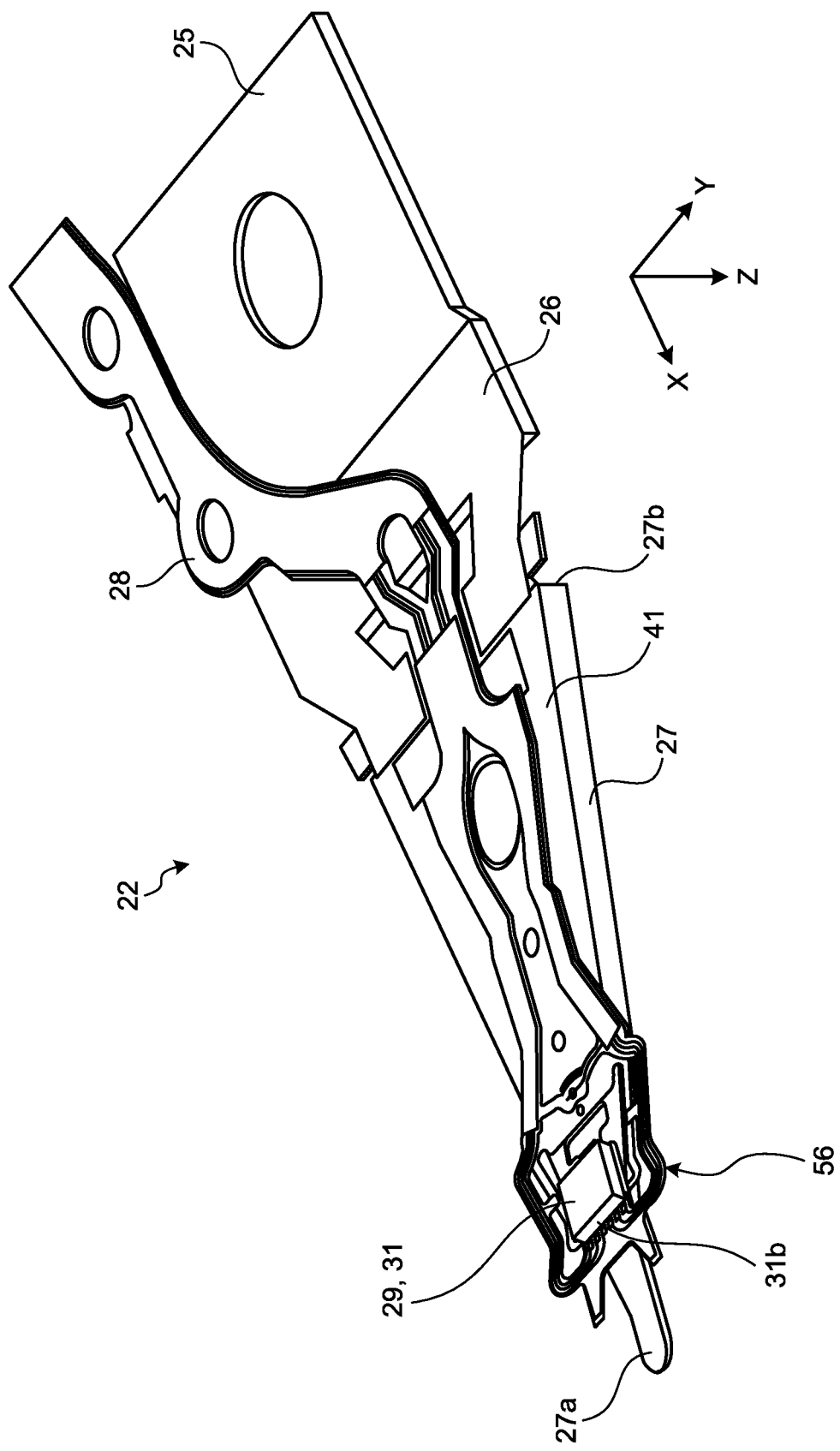
FIG. 2 is a perspective view schematically illustrating a head gimbal assembly (HGA) of the first embodiment.

FIG. 2 is a perspective view schematically illustrating the HGA 22 of the first embodiment. As illustrated in FIG. 2, each of the HGAs 22 includes a base plate 25, a hinge 26, a load beam 27, a flexure 28, and a head unit 29.

The base plate 25, the hinge 26, and the load beam 27 are formed of stainless steel, for example. The materials of the base plate 25, the hinge 26, and the load beam 27 are not limited to this example.

The base plate 25 is attached to a tip end of the carriage arm 21b. The load beam 27 is of a plate shape thinner in thickness than the base plate 25. The load beam 27 is attached to a tip end of the base plate 25 via the hinge 26 having elasticity.

The flexure 28 has an elongated strip shape. The shape of the flexure 28 is not limited to this example. The flexure 28 is a laminated plate including a metal plate (lining layer) such as stainless steel, an insulating layer formed on the metal plate, a conductive layer forming a plurality of wiring arrangements (wiring patterns) on the insulating layer, and a protective layer (insulating layer) covering the conductive layer, for example.

The head unit 29 is mounted on one end of the flexure 28. The other end of the flexure 28 is connected to the FPC 17. The FPC 17 serves to electrically connect the head unit 29 and a controller located outside the housing 11, via the wiring of the flexure 28, for example.

Figure 3:
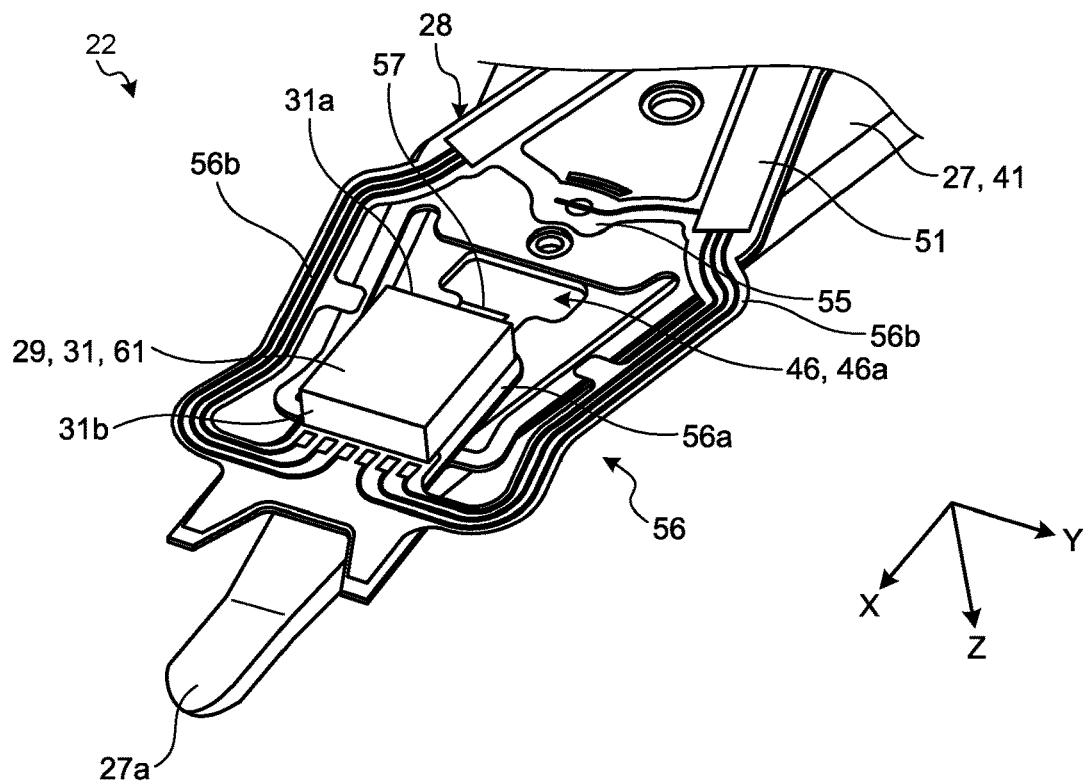
FIG. 3 is a perspective view schematically illustrating a part of the HGA of the first embodiment.
Figure 4:
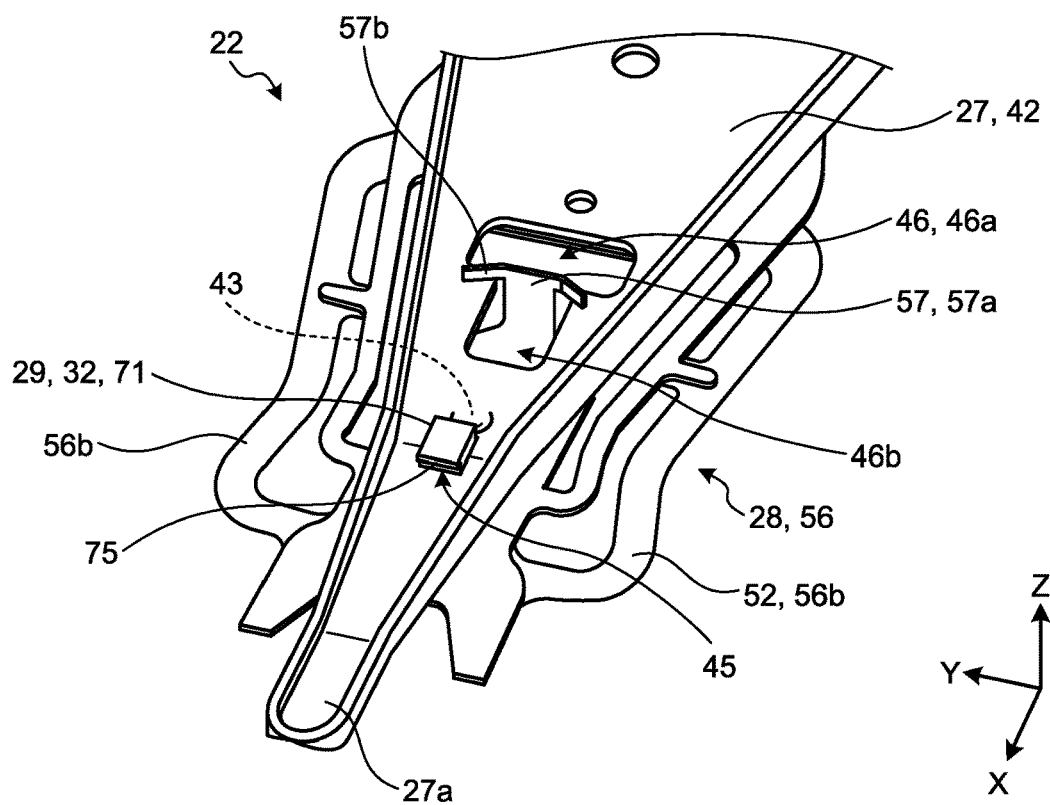
FIG. 4 is a perspective view schematically illustrating a part of the HGA of the first embodiment from a direction different from the direction in FIG. 3.

FIG. 3 is a perspective view schematically illustrating a part of the HGA 22 of the first embodiment. FIG. 4 is a perspective view schematically illustrating a part of the HGA 22 of the first embodiment from a direction different from the direction in FIG. 3. The head unit 29 reads and writes, i.e., reproduces and records, information from and to the magnetic disk 12 by heat assisted magnetic recording (HAMR).

The head unit 29 includes a magnetic head 31 illustrated in FIG. 3 and a laser unit 32 illustrated in FIG. 4. The laser unit 32 is an exemplary heat-assister. The laser unit 32 can be referred as, for example, a heating device, heater, assister, irradiator, unit, or device or part. The laser unit 32 is attached to the magnetic head 31.

To read or write information from or to the magnetic disk 12 by the head unit 29, the carriage 21 is driven by the VCM 15 to place the head unit 29 on a desired track of the rotating magnetic disk 12. The head unit 29 reads and writes information from and to a desired track of the magnetic disk 12 as the magnetic disk 12 rotates.

To access the magnetic disk 12, the VCM 15 rotates or loads the head unit 29 on the magnetic disk 12. At the time of unloading which requires no access to the magnetic disk 12, the VCM 15 rotates the head unit 29 to the position of the ramp load mechanism 16 and stops the head unit 29 there (unloading).

Hereinafter, the HGA 22 will be described in detail. The load beam 27 extends substantially in the same direction as the carriage arm 21b. The extending direction of the load beam 27 may be inclined with respect to the extending direction of the carriage arm 21b.

In the present specification, an X-axis, a Y-axis, and a Z-axis are defined for the sake of convenience, as illustrated in the drawings. The X-axis, the Y-axis, and the Z-axis are orthogonal to one another. The X axis is along the length of the load beam 27. In other words, the X axis is parallel to the extending direction of the carriage arm 21b and the load beam 27. The Y axis is along the width of the load beam 27. The Z axis is along the thickness of the load beam 27.

X direction, Y direction and Z direction are defined in the present specification. The X direction is along the X axis, and includes a +X direction indicated by an arrow X and a −X direction opposite to the arrow X. The Y direction is along the Y axis and includes a +Y direction indicated by an arrow Y and a −Y direction opposite to the arrow Y. The Z direction is along the Z axis and includes a +Z direction indicated by an arrow Z and a −Z direction opposite to the arrow Z.

The load beam 27 extends from the hinge 26 in the +X direction. The load beam 27 includes a tip end 27a and a base end 27b. The tip end 27a is an end of the load beam 27 in the +X direction. The base end 27b is an end of the load beam 27 in the −X direction. The −X direction is an exemplary second direction. The tip end 27a and the base end 27b include not only the end or edge of the load beam 27 but also the portion in the vicinity of the end or edge. The base end 27b is connected to the carriage arm 21b of the carriage 21 via the hinge 26 and the base plate 25.

The load beam 27 has a substantially triangular plate shape. In the Y direction the length or width of the load beam 27 shortens from the base end 27b toward the tip end 27a. In other words, the load beam 27 is tapered in the +X direction. The shape of the load beam 27 is not limited to this example.

Figure 5:
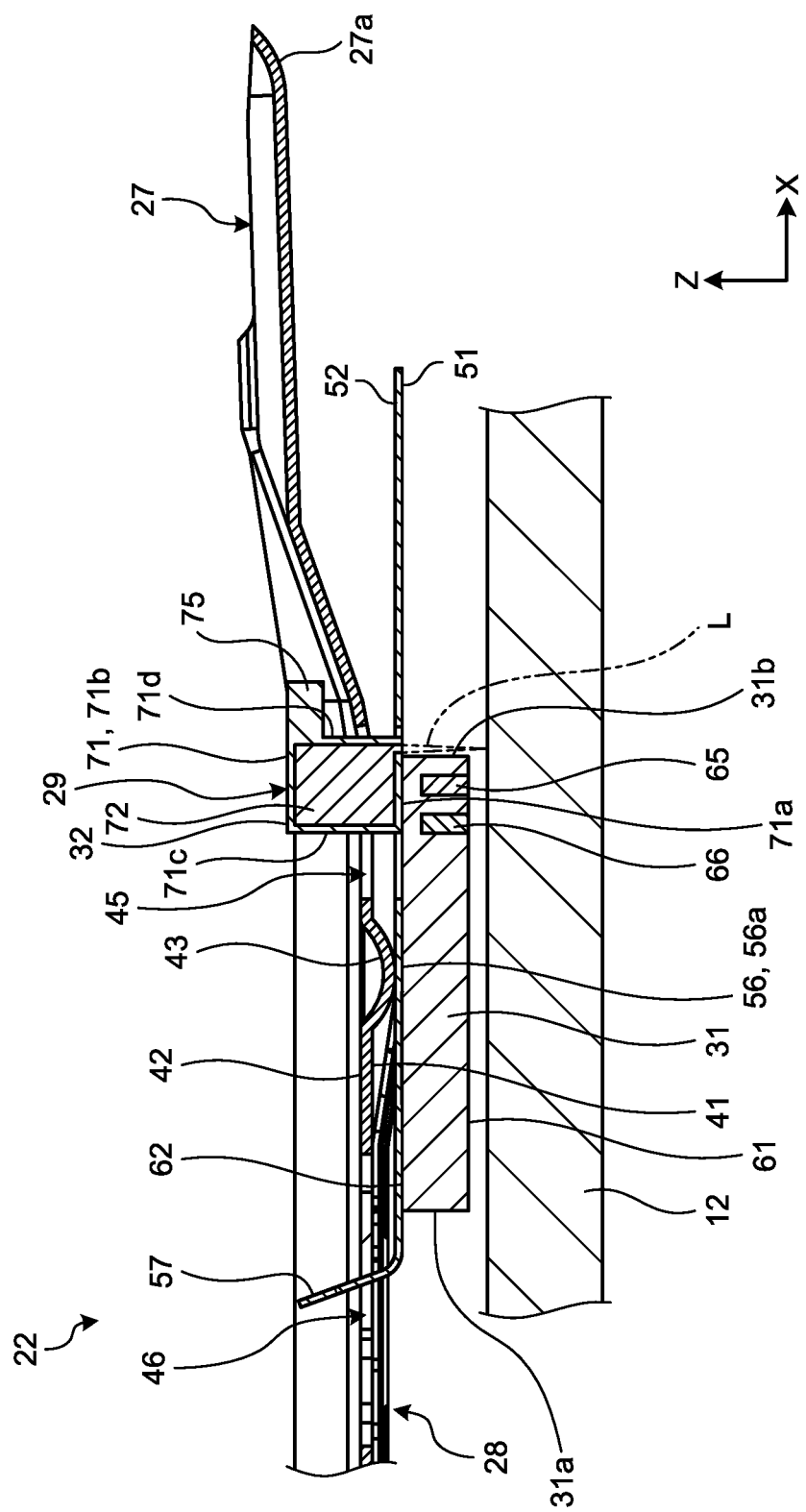
FIG. 5 is a cross-sectional view illustrating a part of the HGA of the first embodiment.

FIG. 5 is a cross-sectional view illustrating a part of the HGA 22 of the first embodiment. As illustrated in FIG. 5, the load beam 27 further includes a lower face 41, an upper face 42, and a dimple 43. In this disclosure, the terms "upper" and "lower" are used for illustrative purpose only with reference to FIG. 5, and are not intended to limit the position, location, and direction of each element. The lower face 41 is an exemplary first surface. The upper surface 42 is an exemplary second surface.

The lower face 41 is substantially flat and faces the −Z direction. At the time of loading, the lower face 41 faces the corresponding magnetic disk 12 with spacing. At the time of unloading, the lower face 41 faces the lower face 41 of another load beam 27 with spacing, for example. The upper face 42 is opposite the lower face 41. The upper face 42 is substantially flat and faces the +Z direction. The X direction and the Y direction are along the lower face 41 and the upper face 42. The Z direction is orthogonal to the lower face 41 and the upper face 42. The dimple 43 is a substantially hemispherical protrusion protruding from the lower face 41.

The load beam 27 is provided with a first through-hole 45 and a second through-hole 46. The first through-hole 45 is an exemplary hole. The first through-hole 45 and the second through-hole 46 penetrate the load beam 27 and opens to the lower face 41 and the upper face 42, respectively. The first through-hole 45 and the second through-hole 46 may be provided as cutouts.

The first through-hole 45 is separated from the dimple 43 in the +X direction. The second through-hole 46 is separated from the dimple 43 in the −X direction. That is, the dimple 43 is located between the first through-hole 45 and the second through-hole 46.

The first through-hole 45 is a substantially rectangular (quadrangular) hole extending in the X direction, for example. As illustrated in FIG. 4, the second through-hole 46 has a substantially T-shape and includes a wider part 46a and a narrower part 46b.

The wider part 46a is a substantially rectangular or quadrangular part extending in the Y direction. The narrower part 46b is a substantially rectangular or quadrangular part, extending in the +X direction from a Y-directional center of the wider part 46a. In the Y direction, the length of the narrower part 46b is shorter than the length of the wider part 46a.

As illustrated in FIG. 5, the flexure 28 has a lower face 51 and an upper face 52. The upper face 52 is an exemplary third face. The lower face 51 faces substantially the −Z direction. The upper face 52 faces substantially the +Z direction. At least a part of the upper face 52 of the flexure 28 faces the lower face 41 of the load beam 27.

As illustrated in FIG. 3, the flexure 28 further includes at least one stationary part 55, a gimbal (elastic support) 56, and a tab 57. The gimbal 56 is an exemplary elastic part. The tab 57 is an exemplary second restrictor. The stationary part 55, the gimbal 56, and the tab 57 are part of the flexure 28. The stationary part 55 and the gimbal 56 each partially have the lower face 51 and the upper face 52.

The upper face 52 of the stationary part 55 contacts with the lower face 41 of the load beam 27. The stationary part 55 is fixed to the lower face 41 of the load beam 27 by spot welding, for example. As a result, the flexure 28 is attached to the lower face 41 of the load beam 27.

The gimbal 56 is located in the vicinity of the tip end 27a of the load beam 27. The gimbal 56 is connected to the stationary part 55 and is elastically movable with respect to the load beam 27 and the stationary part 55.

For example, the gimbal 56 includes a tongue 56a and two arms 56b. The magnetic head 31 of the head unit 29 is attached to the lower face 51 of the tongue 56a. The upper face 52 of the tongue 56a is swingably supported by the dimple 43. The two arms 56b extend from the +Z-directional end of the tongue 56a so as to surround the tongue 56a, and are connected to the stationary part 55 that is apart from the tongue 56a in the −X direction.

Elastic deformation of the two arms 56b enables the tongue 56a and the head unit 29 to swing around the dimple 43 or move away from the lower face 41 of the load beam 27. The tongue 56a is generally maintained in contact with the dimple 43 by the elastic force of the arm 56b.

As illustrated in FIG. 4, the tab 57 includes an insertion 57a and two extensions 57b. The insertion 57a extends from the −X directional end of the tongue 56a through the narrower part 46b of the second through-hole 46. The extension 57b extends from the tip end of the insertion 57a in the Y direction. The extension 57b partially covers the upper face 42 of the load beam 27 in the Z direction. Thus, the load beam 27 is located between the extension 57b and the tongue 56a in the Z direction.

The extension 57b is generally separated from the upper face 42 of the load beam 27 in the +Z direction. For example, due to an impact applied to the HDD 10, the tongue 56a and the head unit 29 may move away from the lower face 41 of the load beam 27 and the dimple 43.

Along with the movement of the magnetic head 31 of the head unit 29 away from the lower face 41 by a given distance, the extension 57b of the tab 57 comes in contact with the upper face 42 of the load beam 27. Thereby, the tab 57 works to restrict the magnetic head 31 from moving further from the lower face 41 beyond the given distance. The given distance is an exemplary second distance. The extension 57b may come in contact with the upper face 52 of the stationary part 55 of the flexure 28.

The tab 57 is formed by bending a part of the flexure 28, for example. At the time of bending the tab 57, the insertion 57a passes through the narrower part 46b of the second through-hole 46 while the extension 57b passes through the wider part 46a of the second through-hole 46. The tab 57 is not limited to this example, and may be another component attached to the flexure 28.

As illustrated in FIG. 3, the magnetic head 31 has a substantially rectangular parallelepiped shape. The magnetic head 31 includes a first end 31a and a second end 31b. The first end 31a is an end of the magnetic head 31 in the −X direction. The second end 31b is an end of the magnetic head 31 in the +X direction. The +X direction is an exemplary third direction. The second end 31b is opposite the first end 31a.

As illustrated in FIG. 5, the magnetic head 31 further includes an opposing face 61 and a mounting face 62. At the time of loading, the opposing face 61 faces the corresponding magnetic disk 12. The mounting face 62 is opposite the opposing face 61, and is attached to the lower face 51 of the tongue 56a with an adhesive, for example.

At the time of loading, each magnetic head 31 reads or writes information from or to the magnetic disk 12 while maintained in a slightly lifted state from the surface of the magnetic disk 12 by the lift occurring from the rotation of the magnetic disk 12. That is, during loading, the opposing face 61 is slightly away from the magnetic disk 12. Airflow is caused by the rotation of the magnetic disk 12, flows in-between the magnetic disk 12 and the magnetic head 31 from the vicinity of the first end 31a, and exits from the vicinity of the second end 31b to the outside.

The magnetic head 31 further includes a write element 65 and a read element 66. The write element 65 may also be referred to as a magnetic-field generating element. The read element 66 may also be referred to as a reproducing element. The write element 65 is located closer to the second end 31b than the read element 66.

The magnetic field generated by the write element 65 works to magnetize a magnetic recording layer of the magnetic disk 12 in a given direction, allowing information to be recorded thereon. The read element 66 reads the recorded information from the magnetic disk 12. In this manner, the read element 66 and the write element 65 of the magnetic head 31 reads and writes from and to the magnetic disk 12.

The laser unit 32 is attached to the mounting face 62 of the magnetic head 31. The laser unit 32 emits laser light L to a micro area, containing the information, on the magnetic recording layer of the magnetic disk 12 to heat the micro area. The heated micro area lowers in coercive force and becomes easier to have information recorded thereon. The laser unit 32 includes an outer shell 71 and an optical device 72. The outer shell 71 can also be referred to as a housing, a container, a case, or a cover, for example.

Figure 6:
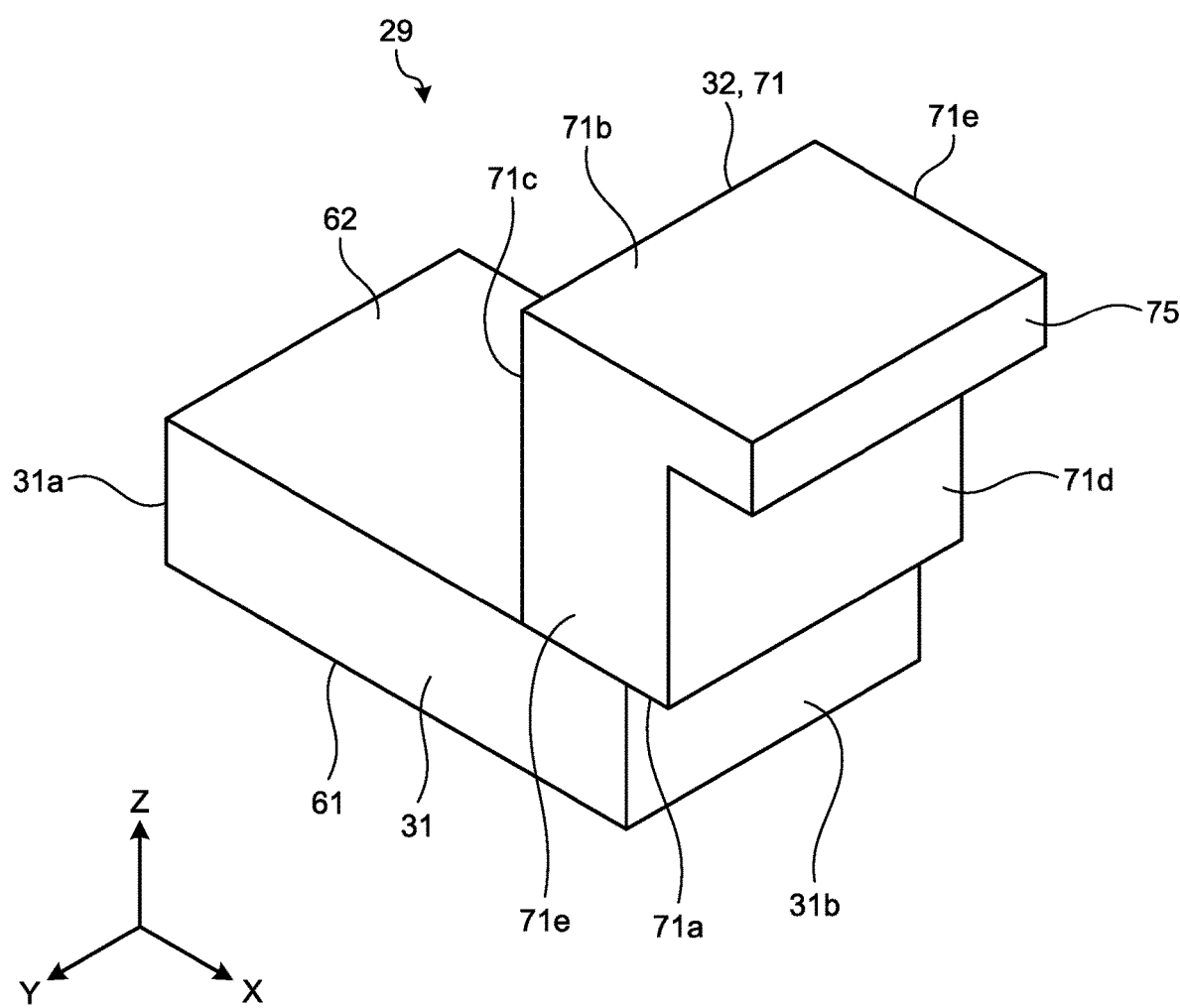
FIG. 6 is a perspective view schematically illustrating a head unit of the first embodiment.

FIG. 6 is a perspective view schematically illustrating the head unit 29 of the first embodiment. The outer shell 71 is formed of metal and has a substantially rectangular parallelepiped box shape, for example. The outer shell 71 includes a lower face 71a, an upper face 71b, a first end face 71c, a second end face 71d illustrated in FIG. 5, and two side faces 71e illustrated in FIG. 6.

As illustrated in FIG. 5, the lower face 71a faces the −Z direction. The lower face 71a is fixed to the mounting face 62 of the magnetic head 31 with an adhesive, for example. The upper face 71b is opposite the lower face 71a, facing the +Z direction.

The first end face 71c is an end face of the outer shell 71 in the −X direction. The second end face 71d is opposite the first end face 71c. The second end face 71d is an end face of the outer shell 71 in the +X direction. The side faces 71e are both end faces of the outer shell 71 in the Y direction.

The laser unit 32 includes a base 32a. The base 32a includes the outer shell 71 and the optical device 72. The base 32a is attached to the magnetic head 31 in the vicinity of the second end 31b. In other words, the base 32a is attached to the magnetic head 31 at a position closer to the second end 31b than to the first end 31a.

The base 32a protrudes from the second end 31b of the magnetic head 31 in the X direction. Thus, the second end 31b of the magnetic head 31 is located between the first end face 71c and the second end face 71d of the outer shell 71 in the X direction. That is, part of the lower face 71a is not fixed to the magnetic head 31 but exposed. A part of the exposed lower face 71a faces the corresponding magnetic disk 12 during loading.

The base 32a is attached to the mounting face 62 of the magnetic head 31 such that the base 32a extends from the mounting face 62 in substantially the Z direction. Substantially the Z direction intersects the lower face 41, and is an exemplary extending direction. The base 32a extends from the mounting face 62 in substantially the Z direction so as to pass through the first through-hole 45. In other words, the base 32a is attached to the mounting face 62 of the magnetic head 31 such that the base 32a can pass through the first through-hole 45. Substantially the Z direction is not limited to the longitudinal direction of the base 32a.

A part of the base 32a protrudes from the lower face 41 of the load beam 27 in the −Z direction through the first through-hole 45. Another part of the base 32a protrudes from the upper face 42 of the load beam 27 in the +Z direction through the first through-hole 45. The base 32a is separated from the edge of the load beam 27 defining the first through-hole 45 and the rest of the load beam 27.

The optical device 72 is housed in the outer shell 71. The optical device 72 includes a laser oscillation element and a lens, for example. The optical device 72 is not limited to this example. The optical device 72 is configured to emit laser light L from the exposed lower face 71a of the outer shell 71 to the magnetic disk 12. The laser light L is an example of light.

The optical device 72 is not limited to this example. For example, the optical device 72 may include a near-field light generating member that converts the laser light L into near-field light. In this case, near-field light is an example of light. The optical device 72 can irradiate and heat the magnetic disk 12 with near-field light.

As described above, the heat-assister exemplified by the laser unit 32 irradiates the magnetic disk 12 with the laser light L or the near-field light to thereby heat a micro area of the magnetic disk 12 and lower the coercive force of the micro area. The heat-assister is not limited to this example, and the magnetic disk 12 may be heated by other means. For example, the heat-assister may irradiate the magnetic disk 12 with an energy ray or infrared light. The heat-assister may heat the magnetic disk 12 by thermal conduction or thermal radiation.

The laser unit 32 is provided with a protrusion 75. The protrusion 75 is an exemplary first restrictor. In the first embodiment, the protrusion 75 is located away from the upper face 42 of the load beam 27 in the +Z direction, protruding in the +X direction from the second end face 71d of the outer shell 71. In other words, the protrusion 75 protrudes from the base 32a in the +Z direction. The +X direction intersects substantially the Z direction, and is an example of first direction and protruding direction.

The protrusion 75 partially covers the upper face 42 of the load beam 27 in the Z direction (substantially Z direction). In other words, the protrusion 75 and a part of the load beam 27 are at the same position in the X direction. The load beam 27 is located between the protrusion 75 and the tongue 56a in the Z direction.

In the +X direction (X direction), the total length of the laser unit 32 and the protrusion 75 is shorter than the length of the first through-hole 45. In other words, in the X direction, the sum of the distance between the first end face 71c and the second end face 71d of the outer shell 71 and the length of the protrusion 75 is shorter than the length of the first through-hole 45.

In the Y direction, the length of the laser unit 32 is shorter than the length of the first through-hole 45. In the Y direction, the length of the protrusion 75 is shorter than the length of the first through-hole 45. In the Y direction, the protrusion 75 may be the same as or different in length from the laser unit 32.

The part of the laser unit 32 including the protrusion 75 is larger in cross-sectional area orthogonal to substantially the Z direction than the part of the laser unit 32 passing through the first through-hole 45. In other words, the cross-sectional area of the base 32a and the protrusion 75 orthogonal to substantially the Z direction is larger than the cross-sectional area of the base 32a orthogonal to substantially the Z direction. In the present embodiment, the area of the upper face 71b of the outer shell 71 including the protrusion 75 is larger than the area of the lower face 71a of the outer shell 71.

The protrusion 75 is generally separated from the upper face 42 of the load beam 27 in the +Z direction. Due to an impact applied to the HDD 10, for example, the tongue 56a and the head unit 29 may move away from the lower face 41 of the load beam 27 and the dimple 43.

Along with the movement of the magnetic head 31 of the head unit 29 away from the lower face 41 by a given distance, the protrusion 75 comes in contact with the upper face 42 of the load beam 27. Thereby, the protrusion 75 serves to restrict the magnetic head 31 from moving further from the lower face 41 beyond the given distance. The given distance is an exemplary first distance. The protrusion 75 may come in contact with the upper face 52 of the stationary part 55 of the flexure 28.

As described above, at two separate positions in the X direction, the protrusion 75 and the tab 57 restrict the magnetic head 31 from moving away from the lower face 41 beyond the given distance. The tab 57 is apart from the protrusion 75 in the −X direction. The dimple 43 is located between the tab 57 and the protrusion 75 in the X direction. The first distance and the second distance may be the same or different from each other.

Hereinafter, an assembly method of the HGA 22 as a part of a manufacturing method of the HDD 10 will be described by way of example. The manufacturing method of the HDD 10 is not limited to the following method, and other methods may be used. First, the stationary part 55 of the flexure 28 is fixed to the lower face 41 of the load beam 27 by spot welding.

Figure 7:
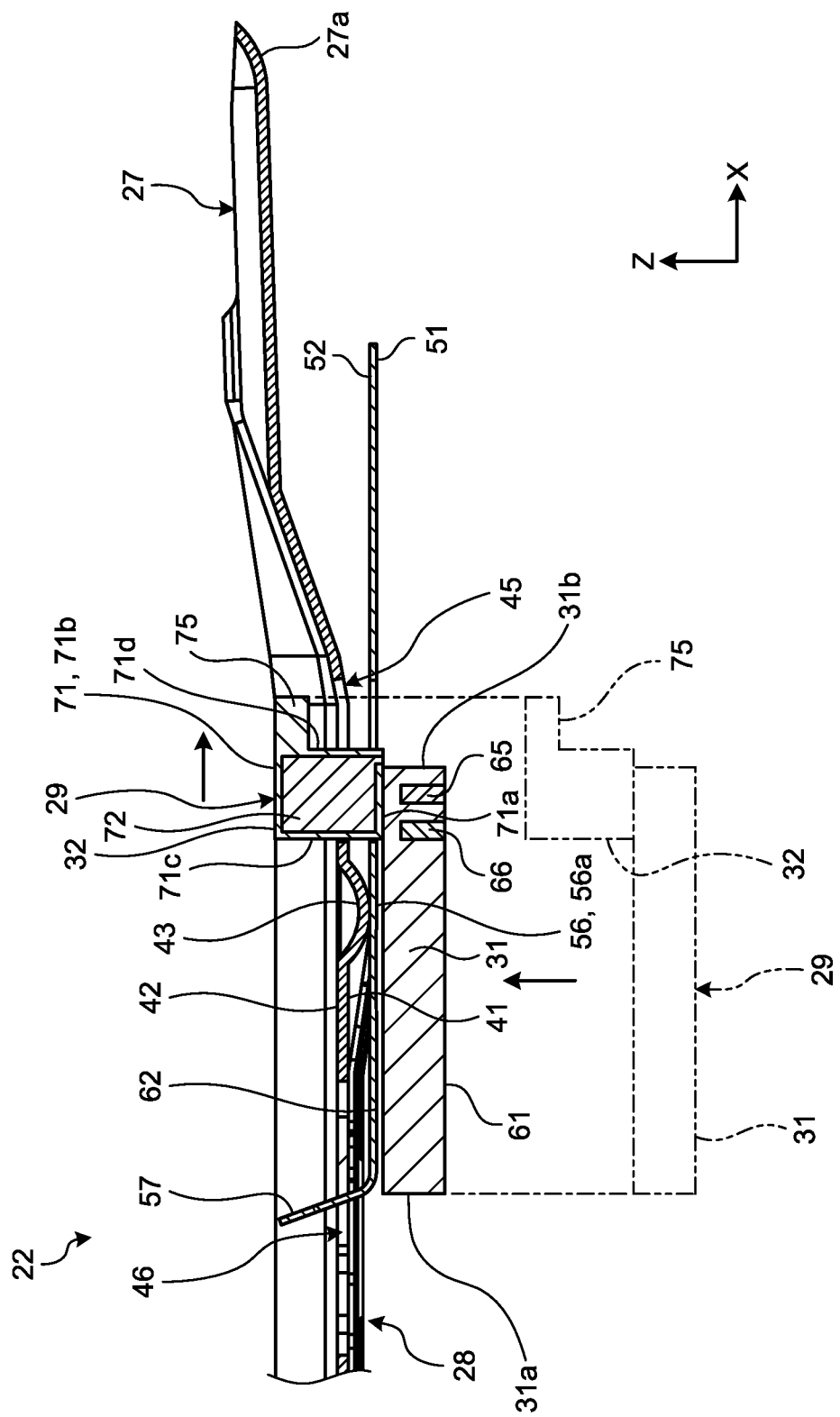
FIG. 7 is a cross-sectional view schematically illustrating an example of a method of mounting the head unit of the first embodiment.

FIG. 7 is a cross-sectional view schematically illustrating an exemplary mounting method of the head unit 29 of the first embodiment. As illustrated in FIG. 7, the laser unit 32 is mounted in advance to the magnetic head 31. For example, the magnetic head 31 and the laser unit 32 are individually inspected to determine if they meet the quality standard. The magnetic head 31 and the laser unit 32 having passed the inspection are joined together. The inspection is not limited to this example.

The magnetic head 31 is then placed close to the lower face 51 of the flexure 28, so that the laser unit 32 passes through the first through-hole 45. The laser unit 32 including the protrusion 75 is smaller in size than the first through-hole 45 in the X direction and the Y direction. Thus, the laser unit 32 can pass through the first through-hole 45.

FIG. 7 illustrates a virtual head unit 29 before the laser unit 32 passes through the first through-hole 45, by the chain double-dashed line, and the head unit 29 after the laser unit 32 has passed through the first through-hole 45, by the solid line. As illustrated in FIG. 7, at the time when the laser unit 32 has passed through the first through-hole 45, the protrusion 75 partially covers the first through-hole 45 but does not cover the upper face 42 of the load beam 27.

Next, the head unit 29 is moved in the +X direction coinciding with the protruding direction of the protrusion 75 from the outer shell 71. By this movement, the protrusion 75 partially covers the upper face 42 of the load beam 27, as illustrated in FIG. 5. The mounting face 62 of the magnetic head 31 is attached to the flexure 28 while the protrusion 75 partially covers the upper face 42. The HGA 22 is assembled in the manner as described above.

In the HDD 10 according to the first embodiment described above, the laser unit 32 is attached to the magnetic head 31 to heat the magnetic disk 12. This increases the weight of the head unit 29 including the magnetic head 31. Because of the weight increase, the head unit 29 may easily vibrate and move away from the lower face 41 if the HDD 10 receives an impact. In the present embodiment, however, the head unit 29 is provided with the protrusion 75. The protrusion 75 serves to restrict further movement of the magnetic head 31 from the lower face 41 beyond the given distance by coming in contact with at least one of the load beam 27 and the flexure 28, if the magnetic head 31 moves away from the lower face 41 by the given distance. That is, the head unit 29, which is likely to vibrate due to the added mass of the laser unit 32, is provided with the protrusion 75 serving to restrict the vibration beyond the given distance. This makes it possible to restrict the magnetic head 31 from moving away from the lower face 41 beyond a given distance in the heat assisted recording HDD 10 incorporating the laser unit 32. Thus, the magnetic head 31 can be prevented from colliding with the opposing magnetic head 31, for example. Furthermore, the magnetic head 31 can be less hindered from being lifted by the plastic deformation of a vibrating gimbal 56 caused by an impact. Consequently, the HDD 10 can be improved in impact resistance.

The protrusion 75 can also be described as follows. That is, the protrusion 75 protrudes from the base 32a of the laser unit 32 in the +X direction to partially cover at least one of the load beam 27 and the flexure 28 in substantially the Z direction. Because of this, the protrusion 75 can restrict the magnetic head 31 having moved at the given distance in the −Z direction from moving further from the lower face 41 beyond the given distance by coming in contact with the at least one of the load beam 27 and the flexure 28. It is thus possible to prevent the magnetic head 31 from colliding with the opposing magnetic head 31, for example, leading to improving impact resistance of the HDD 10.

The load beam 27 has an upper face 42 opposite to the lower face 41 and is provided with the first through-hole 45. The flexure 28 has the upper face 52 facing the lower face 41. The laser unit 32 is attached to the magnetic head 31 such that the laser unit 32 can pass through the first through-hole 45. The laser unit 32 includes the protrusion 75 that partially covers at least one of the upper face 42 of the load beam 27 and the upper face 52 of the flexure 28. Thereby, the protrusion 75 comes in contact with and is supported by at least one of the upper faces 42 and 52 along with the movement of the magnetic head 31 away from the lower face 41 by a given distance. That is, as compared with using other means such as friction, the protrusion 75, which restricts the movement of the magnetic head 31 by supporting, can ensure that the magnetic head 31 is prevented from moving apart from the lower face 41 beyond a given distance. Furthermore, the protrusion 75 of the laser unit 32 serves to restrict the magnetic head 31 to which the laser unit 32 is attached, from moving away from the load beam 27. This can further ensure that the magnetic head 31 is prevented from moving apart from the lower face 41 beyond a given distance, as compared with restricting the movement of the magnetic head 31 at a position far from the laser unit 32.

The protrusion 75 protrudes from the outer shell 71 of the laser unit 32. This facilitates the design of the protrusion 75 serving as the first restrictor that restricts the movement of the magnetic head 31 beyond a given distance.

The protrusion 75 protrudes from the outer shell 71 in the +X direction along the lower face 41. In the +X direction, the total length of the laser unit 32 and the protrusion 75 is shorter than the length of the first through-hole 45. This allows the laser unit 32 to pass through the first through-hole 45 in attaching the magnetic head 31 to which the laser unit 32 is attached in advance to the flexure 28. This facilitates the manufacturing of the HDD 10.

The Y-directional width of the load beam 27 tapers in the +X direction. The protrusion 75 protrudes from the outer shell 71 in the +X direction. This makes it easier to form the first through-hole 45 long in the X direction in the load beam 27.

The protrusion 75 partially covers the upper face 42 of the load beam 27 and comes in contact with the upper face 42 to restrict the magnetic head 31, having moved away from the lower face 41 by the given distance, from moving further from the lower face 41 beyond the given distance. That is, the protrusion 75 is in contact with and supported by the load beam 27. With this configuration, the protrusion 75 can further ensure that the magnetic head 31 is prevented from moving apart from the lower face 41 beyond the given distance, as compared with the protrusion 75 supported by an elastically deformable portion of the flexure 28.

A base end 27b is an end of the load beam 27 in the −X direction and is directly or indirectly connected to the carriage 21. The magnetic head 31 includes the first end 31a in the −X direction and the second end 31b in the +X direction opposite to the −X direction. The laser unit 32 is attached to the magnetic head 31 at a position closer to the second end 31b than to the first end 31a. That is, the laser unit 32 is attached to the magnetic head 31 in the vicinity of the tip of the HGA 22. Because of this, an impact applied to the HDD 10 may cause the head unit 29 to easily vibrate and move away from the lower face 41. In the present embodiment, however, the head unit 29 is provided with the protrusion 75, as described above, which makes it possible to restrict the magnetic head 31 from moving away from the lower face 41 beyond a given distance.

The tab 57 is included in the flexure 28 apart from the protrusion 75 in the −X direction. Along with the movement of the magnetic head 31 away from the lower face 41 by a given distance, the tab 57 comes in contact with at least one of the load beam 27 and the flexure 28 and thereby restricts the magnetic head 31 from moving further from the lower face 41 beyond the given distance. That is, at two separate positions in the X direction, the protrusion 75 and the tab 57 function to restrict the movement of the magnetic head 31. This can ensure that the magnetic head 31 is prevented from moving apart from the lower face 41 beyond a given distance.

Figure 8:
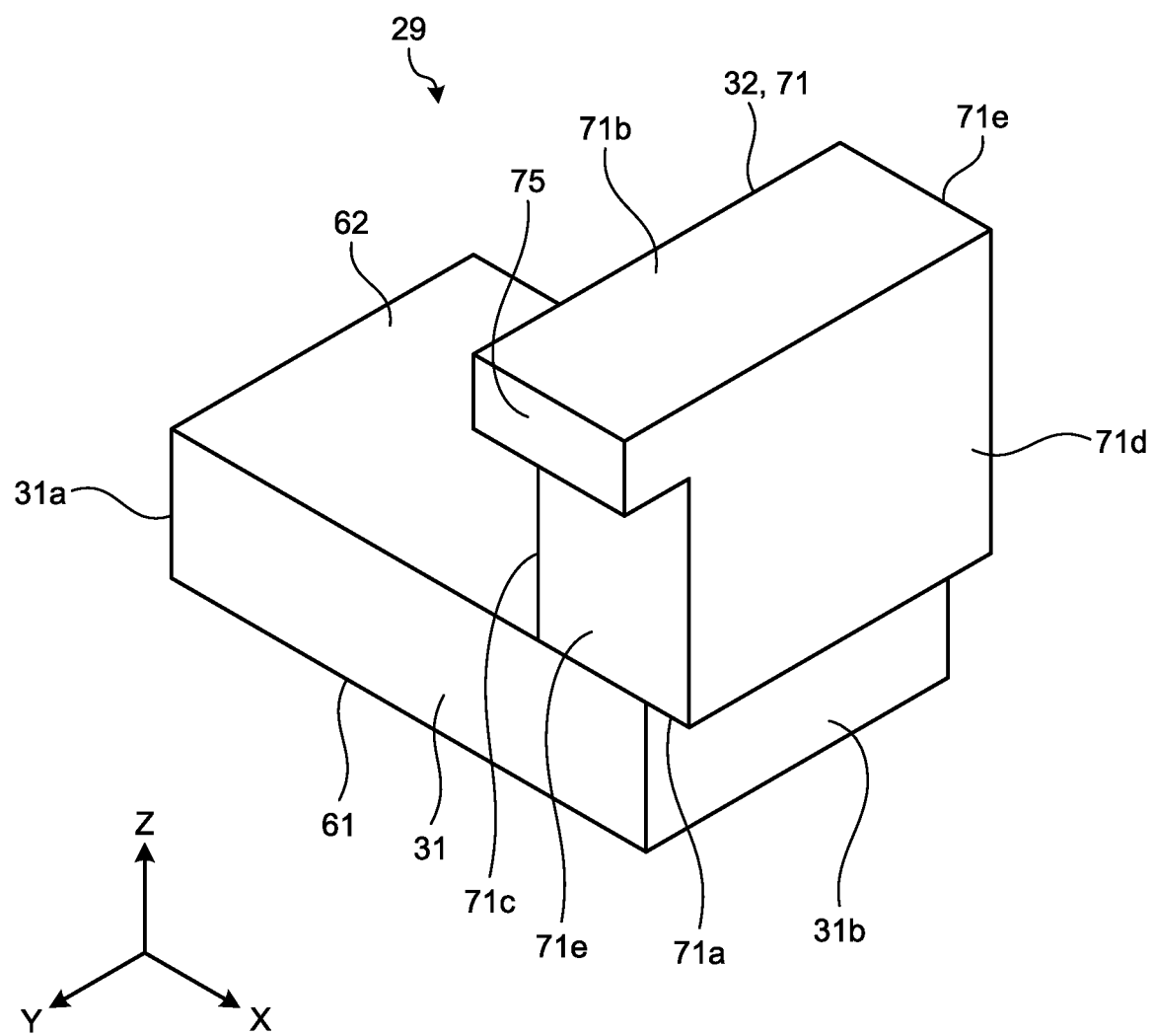
FIG. 8 is a perspective view schematically illustrating a head unit according to a modification of the first embodiment.

FIG. 8 is a perspective view schematically illustrating the head unit 29 according to a modification of the first embodiment. As illustrated in FIG. 8, the protrusion 75 may protrude from the side face 71e of the outer shell 71 in the +Y direction or the −Y direction. In other words, the protrusion 75 may protrude from the base 32a of the laser unit 32 in the +Y direction or the −Y direction. In this case, in the Y direction, the total length of the laser unit 32 and the protrusion 75 is set at least partially shorter than the length of the first through-hole 45.

Second Embodiment

Hereinafter, a second embodiment will be described with reference to FIG. 9. In the following embodiments, constituent elements with functions similar to the functions of the already-described elements, are denoted by the same reference numerals and description thereof may be omitted. Constituent elements denoted by the same reference numeral may not have the same function or property but may have different functions and properties according to the respective embodiments.

Figure 9:
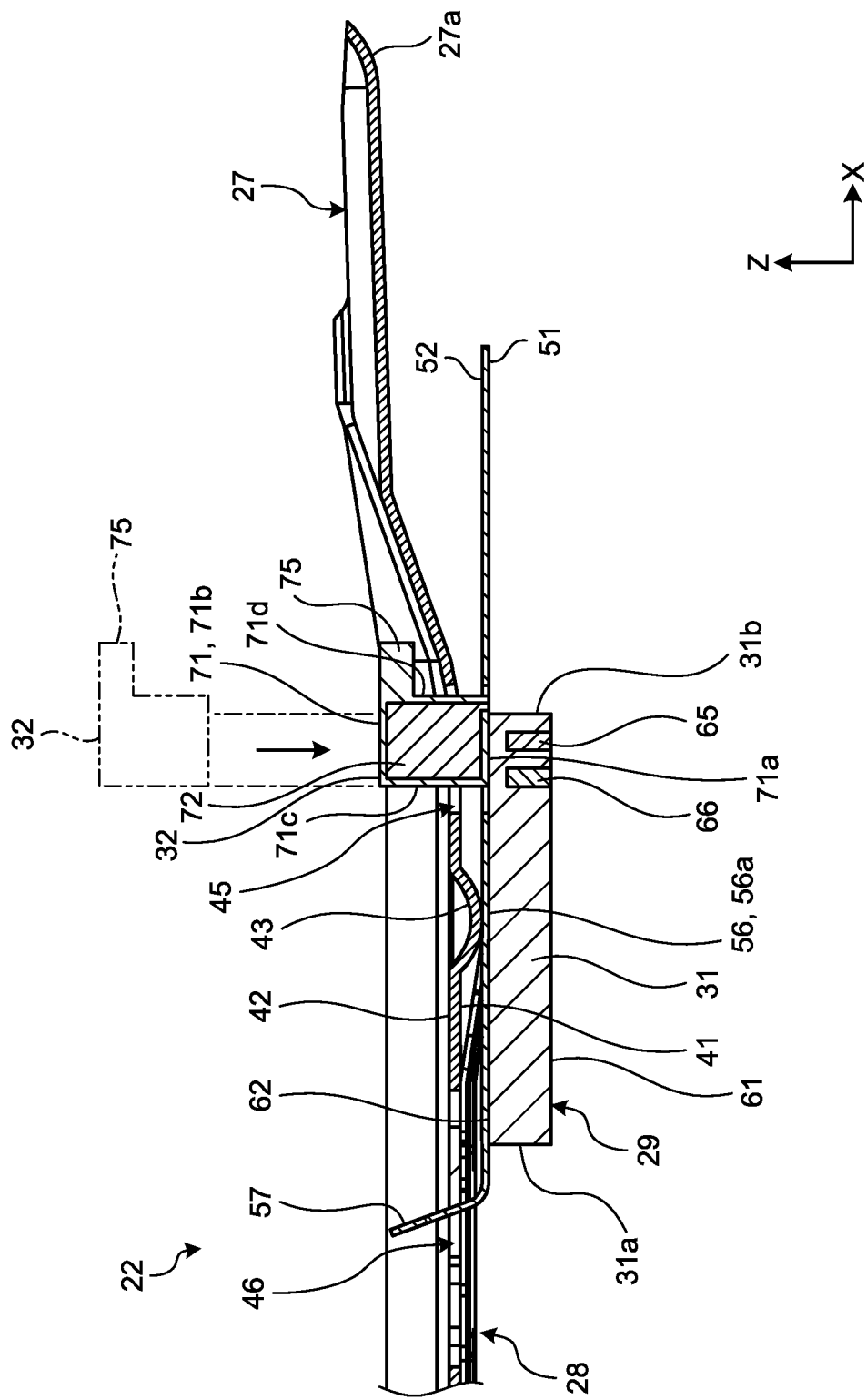
FIG. 9 is a cross-sectional view illustrating a part of a HGA according to a second embodiment.

FIG. 9 is a sectional view illustrating a part of the HGA 22 according to the second embodiment. As illustrated in FIG. 9, in the second embodiment, the protrusion 75 protrudes in the +X direction from the second end face 71d of the outer shell 71. In the +X direction (X direction), the total length of the laser unit 32 and the protrusion 75 is longer than the length of the first through-hole 45. In other words, in the X direction, the sum of the distance between the first end face 71c and the second end face 71d of the outer shell 71 and the length of the protrusion 75 is longer than the length of the first through-hole 45.

Meanwhile, in the +X direction (X direction) the length of the laser unit 32 is shorter than the length of the first through-hole 45. In other words, in the X direction, the distance between the first end face 71c and the second end face 71d of the outer shell 71 is shorter than the length of the first through-hole 45. The laser unit 32 is separated from the edge of the load beam 27 defining the first through-hole 45 and the rest of the load beam 27.

The following will describe an assembly method of the HGA 22 as a part of the manufacturing method of the HDD 10 according to the second embodiment by way of example. First, the stationary part 55 of the flexure 28 is fixed to the lower face 41 of the load beam 27 by spot welding.

Next, before attachment of the laser unit 32, the mounting face 62 of the magnetic head 31 having passed the inspection is attached to the flexure 28. Next, the laser unit 32 having passed the inspection is placed close to the mounting face 62 of the magnetic head 31 through the first through-hole 45. FIG. 9 illustrates a virtual laser unit 32 before passing through the first through-hole 45, by the chained double-dashed line, and the laser unit 32 after passing through the first through-hole 45, by the solid line.

The laser unit 32 excluding the protrusion 75 is smaller in size than the first through-hole 45 in the X direction and the Y direction. Thus, the laser unit 32 can pass through the first through-hole 45.

Next, the laser unit 32 is attached to the mounting face 62 of the magnetic head 31 with the protrusion 75 partially covering the upper face 42 of the load beam 27. The HGA 22 is assembled in the manner as described above.

In the HDD 10 of the second embodiment described above, the protrusion 75 protrudes from the outer shell 71 in the +X direction along the lower face 41. In the +X direction, the total length of the laser unit 32 and the protrusion 75 is longer than the length of the first through-hole 45. In the +X direction, the length of the laser unit 32 is shorter than the length of the first through-hole 45. That is, the protrusion 75 can reliably contact with at least one of the load beam 27 and the flexure 28 along with the movement of the magnetic head 31 away from the lower face 41 by a given distance. Moreover, the size of the first through-hole 45 can be reduced. In manufacturing the HDD 10 of the present embodiment, the magnetic head 31 is attached to the flexure 28 in advance, and the laser unit 32 is then attached to the magnetic head 31 such that the laser unit 32 passes through the first through-hole 45. This makes it possible to avoid complication of the manufacturing of the HDD 10.

Figure 10:
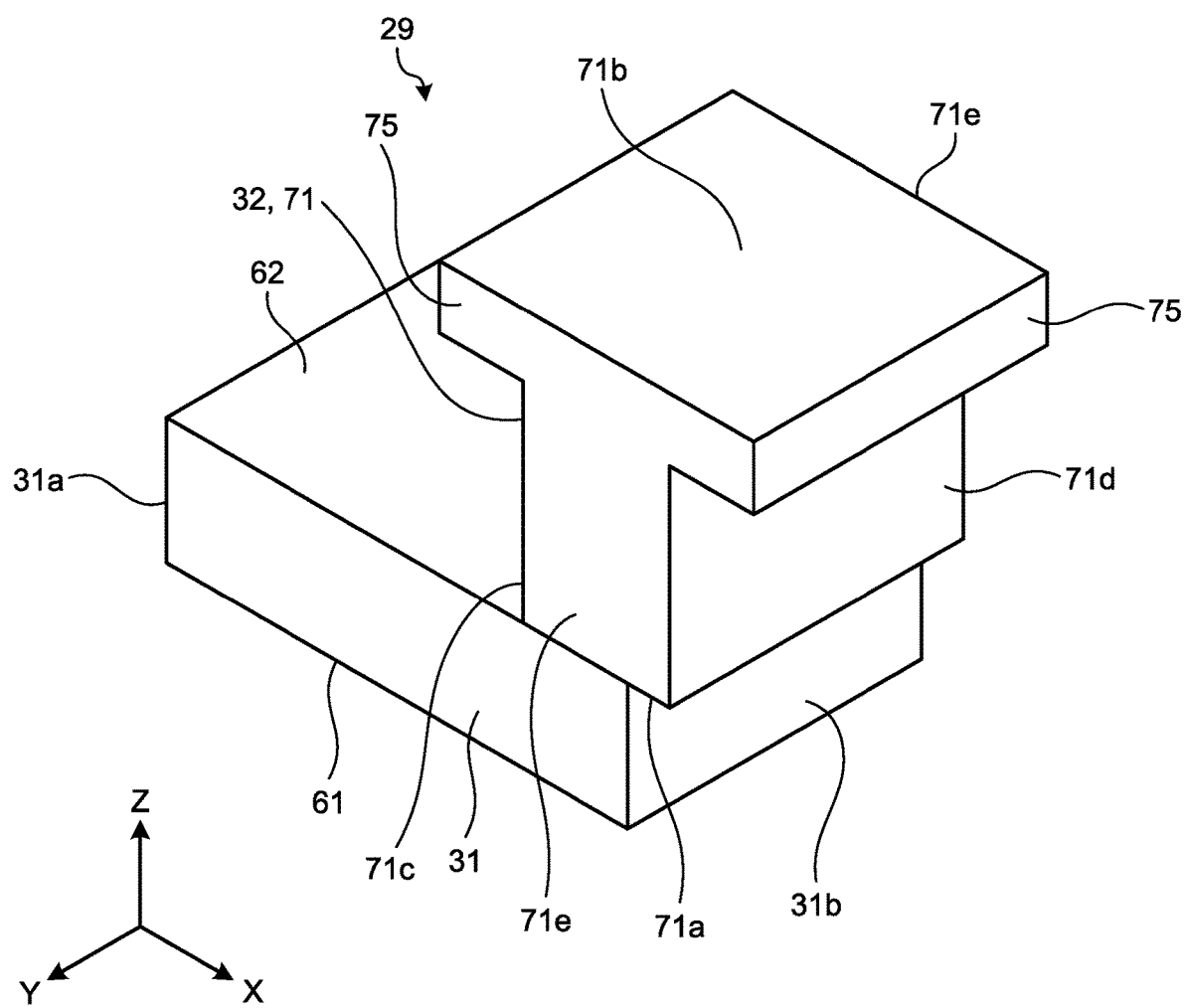
FIG. 10 is a perspective view schematically illustrating a head unit according to a first modification of the second embodiment.
Figure 11:
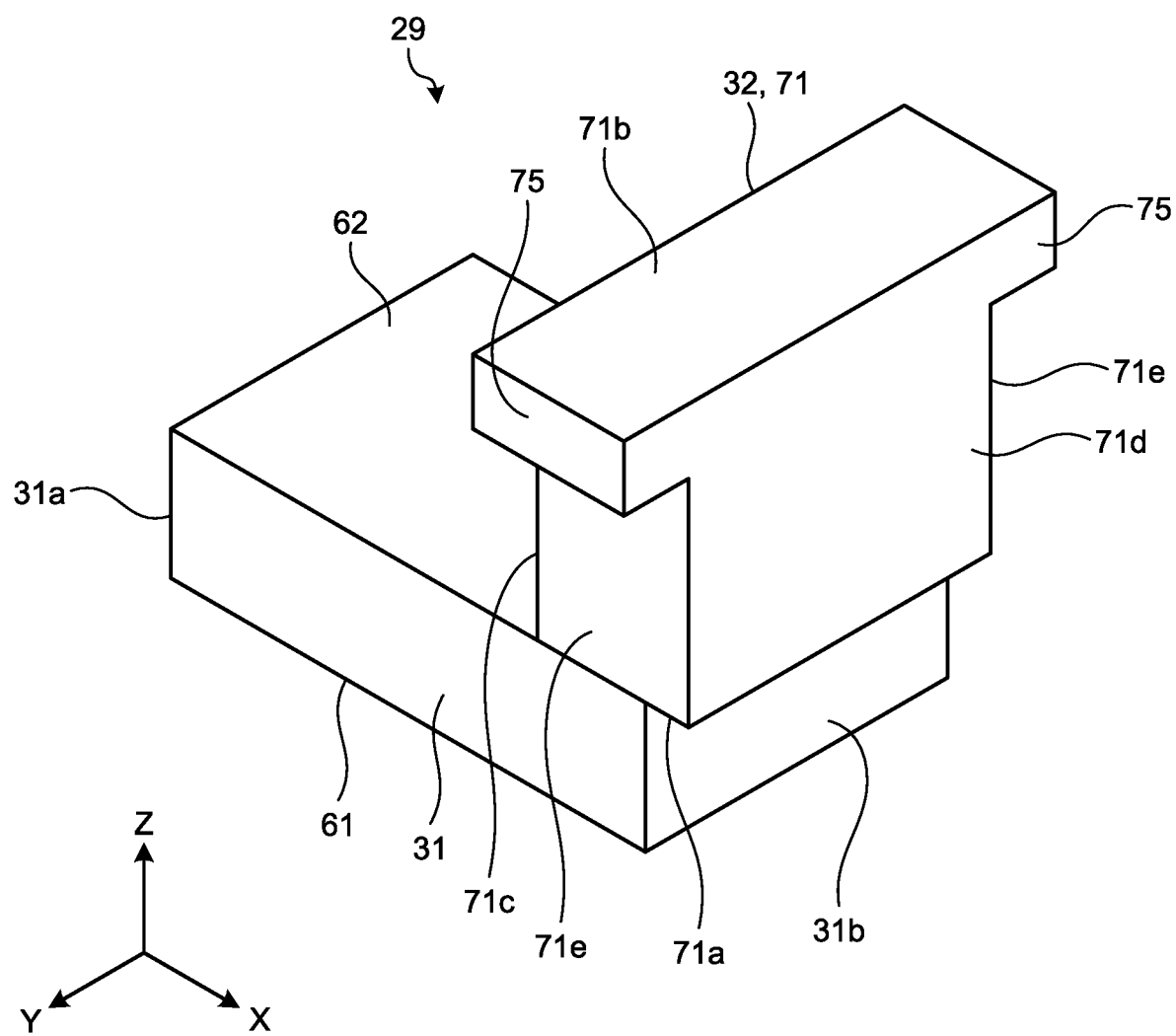
FIG. 11 is a perspective view schematically illustrating a head unit according to a second modification of the second embodiment.

FIG. 10 is a perspective view schematically illustrating the head unit 29 according to a first modification of the second embodiment. FIG. 11 is a perspective view schematically illustrating the head unit 29 according to a second modification of the second embodiment. As illustrated in FIGS. 10 and 11, the head unit 29 may include a plurality of protrusions 75. In the examples of FIGS. 10 and 11, two protrusions 75 protrude from the outer shell 71 of the base 32a.

In the example of FIG. 10, one of the protrusions 75 protrudes in the +X direction from the first end face 71c of the outer shell 71 of the base 32a. The other protrusion 75 protrudes in the −X direction from the second end face 71d of the outer shell 71 of the base 32a. In the X direction, the total length of the laser unit 32 and the two protrusions 75 is set shorter than the length of the first through-hole 45.

In the example of FIG. 11, the two protrusions 75 protrude in the Y direction from the two side faces 71e of the outer shell 71 of the base 32a. In this case, the total length of the laser unit 32 and the two protrusions 75 is set shorter than the length of the first through-hole 45 in the Y direction.

Third Embodiment

Figure 12:
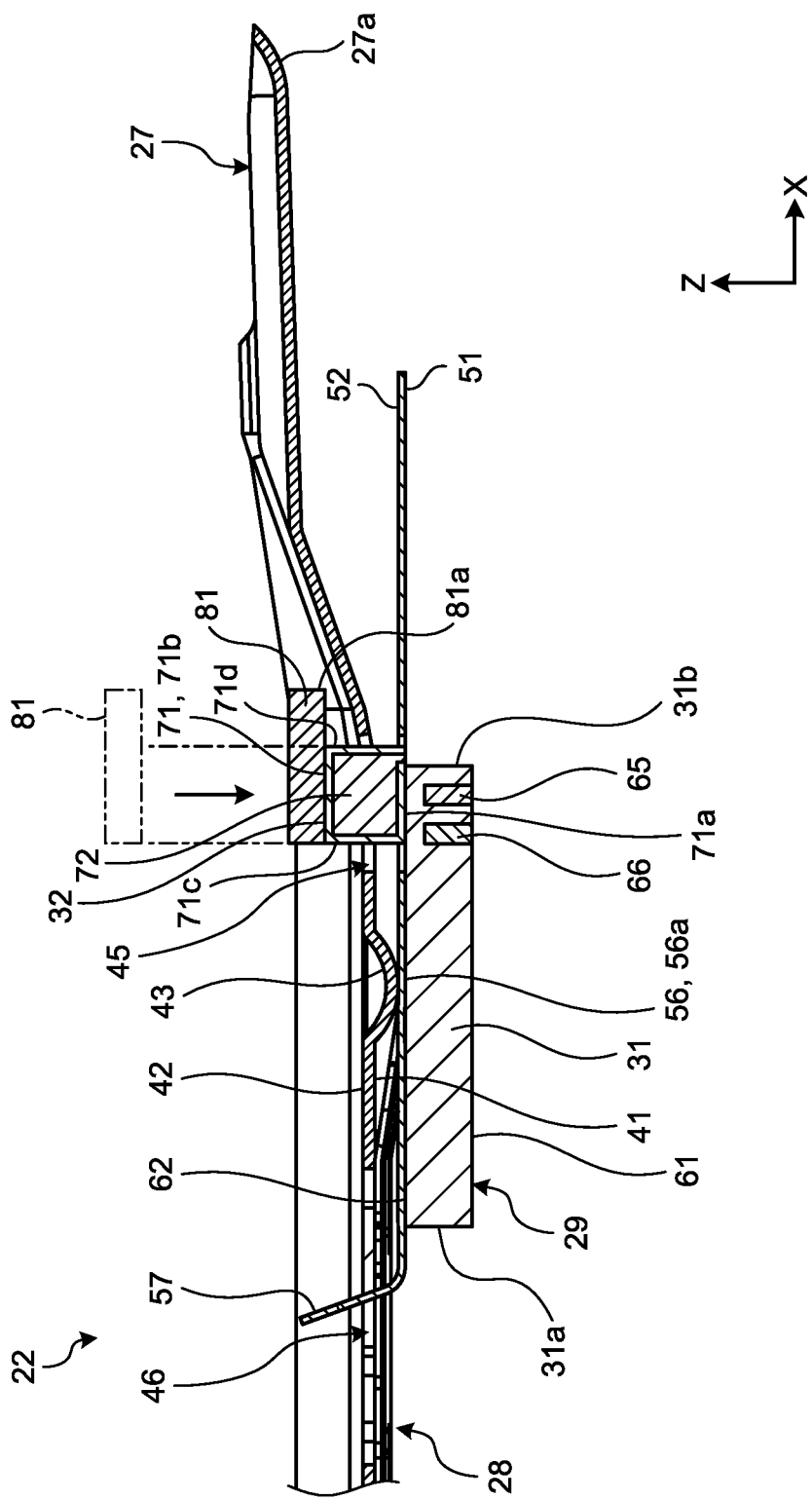
FIG. 12 is a cross-sectional view schematically illustrating a part of a HGA according to a third embodiment.

Hereinafter, a third embodiment will be described with reference to FIG. 12. FIG. 12 is a cross-sectional view schematically illustrating a part of the HGA 22 according to the third embodiment. As illustrated in FIG. 12, in the third embodiment, the HDD 10 further includes a restricting member 81 instead of the protrusion 75. The restricting member 81 is an exemplary first restrictor. The HDD 10 may include both the protrusion 75 and the restricting member 81.

The restricting member 81 is formed of metal and has a plate shape, for example. The material and shape of the restricting member 81 are not limited to this example. The restricting member 81 is attached to the upper face 71b of the outer shell 71 with an adhesive, for example.

A part of the restricting member 81 protrudes in the +X direction from the second end face 71d of the outer shell 71, for example. The restricting member 81 partially covers the upper face 42 of the load beam 27 in the Z direction.

In the X direction, the distance between the first end face 71c of the outer shell 71 and an end face 81a of the restricting member 81 in the +X direction is longer than the length of the first through-hole 45. Meanwhile, in the +X direction (X direction), the length of the laser unit 32 is shorter than the length of the first through-hole 45. In other words, in the X direction, the distance between the first end face 71c and the second end face 71d of the outer shell 71 is shorter than the length of the first through-hole 45. The laser unit 32 and the restricting member 81 are separated from the edge of the load beam 27 defining the first through-hole 45 and the rest of the load beam 27.

For example, an impact applied to the HDD 10 may cause the tongue 56a and the head unit 29 to move away from the lower face 41 of the load beam 27 and the dimple 43. Along with the movement of the magnetic head 31 of the head unit 29 away from the lower face 41 by a given distance, the restricting member 81 comes in contact with the upper face 42 of the load beam 27. Thereby, the restricting member 81 can restrict the magnetic head 31 from moving away from the lower face 41 beyond the given distance. The given distance is an exemplary first distance. The restricting member 81 may come in contact with the upper face 52 of the stationary part 55 of the flexure 28.

Hereinafter, an assembly method of the HGA 22 as a part of the manufacturing method of the HDD 10 according to the third embodiment will be described by way of example. First, the stationary part 55 of the flexure 28 is fixed to the lower face 41 of the load beam 27 by spot welding. Next, the mounting face 62 of the magnetic head 31 is attached to the flexure 28.

The laser unit 32 may be attached in advance to the magnetic head 31, or may be attached to the magnetic head 31 attached to the flexure 28. The laser unit 32 passes through the first through-hole 45 when the magnetic head 31 is placed closer to the flexure 28 or when the laser unit 32 is placed closer to the mounting face 62 of the magnetic head 31.

Next, the restricting member 81, while partially covering the upper face 42 of the load beam 27, is attached to the upper face 71b of the outer shell 71. FIG. 12 illustrates a virtual restricting member 81 before being attached to the laser unit 32, by the chained double-dashed, and the restricting member 81 after being attached to the laser unit 32, by the solid line. The HGA 22 is assembled in the manner as described above.

In the HDD 10 of the third embodiment described above, the restricting member 81 is attached to the outer shell 71 of the laser unit 32. This can facilitate the manufacturing of the laser unit 32 including the first restrictor without forming the first restrictor such as the restricting member 81 and the laser unit 32 in a unified manner.

Fourth Embodiment

Figure 13:
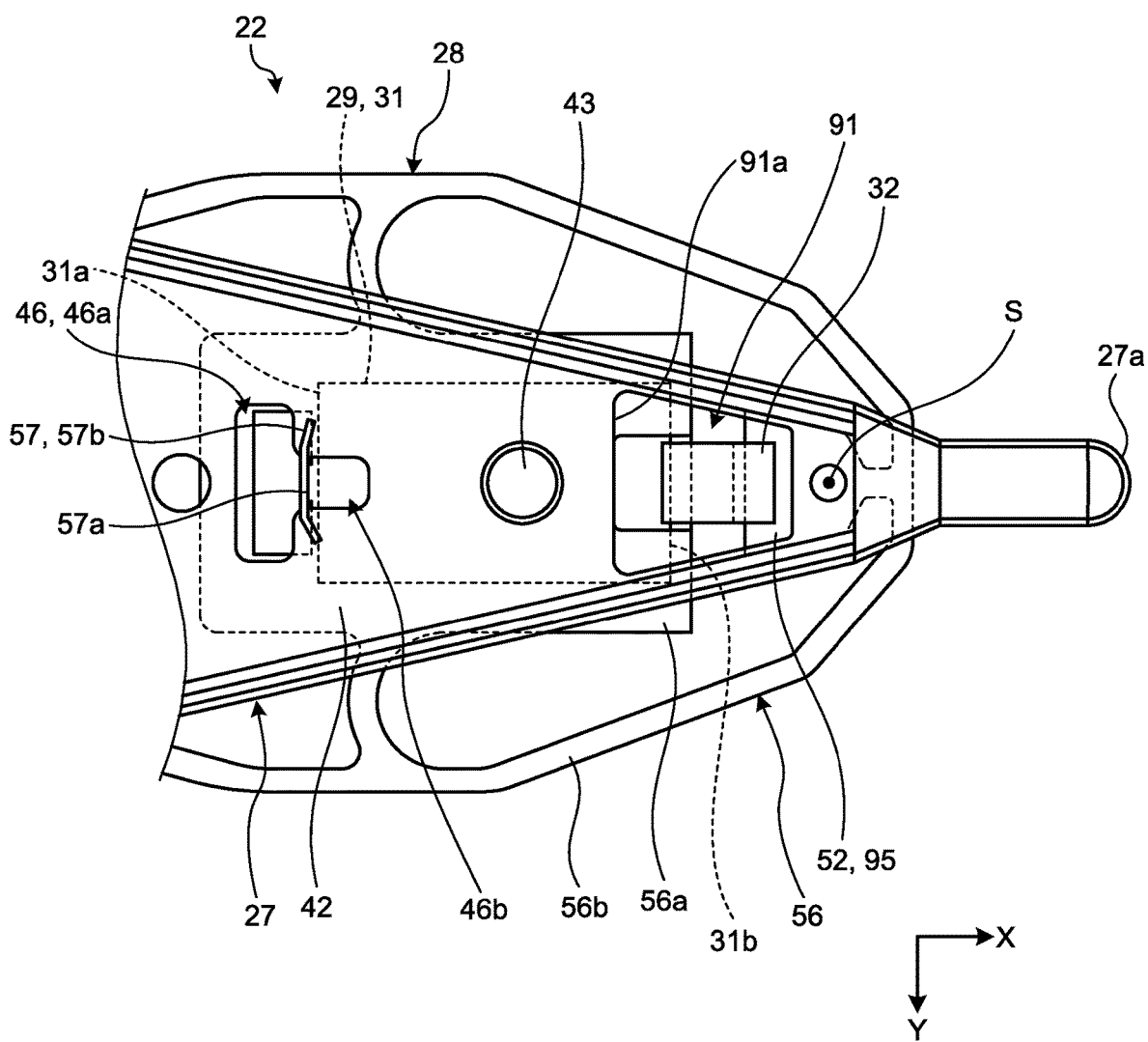
FIG. 13 is a plan view schematically illustrating a part of a HGA 22 according to a fourth embodiment.
Figure 14:
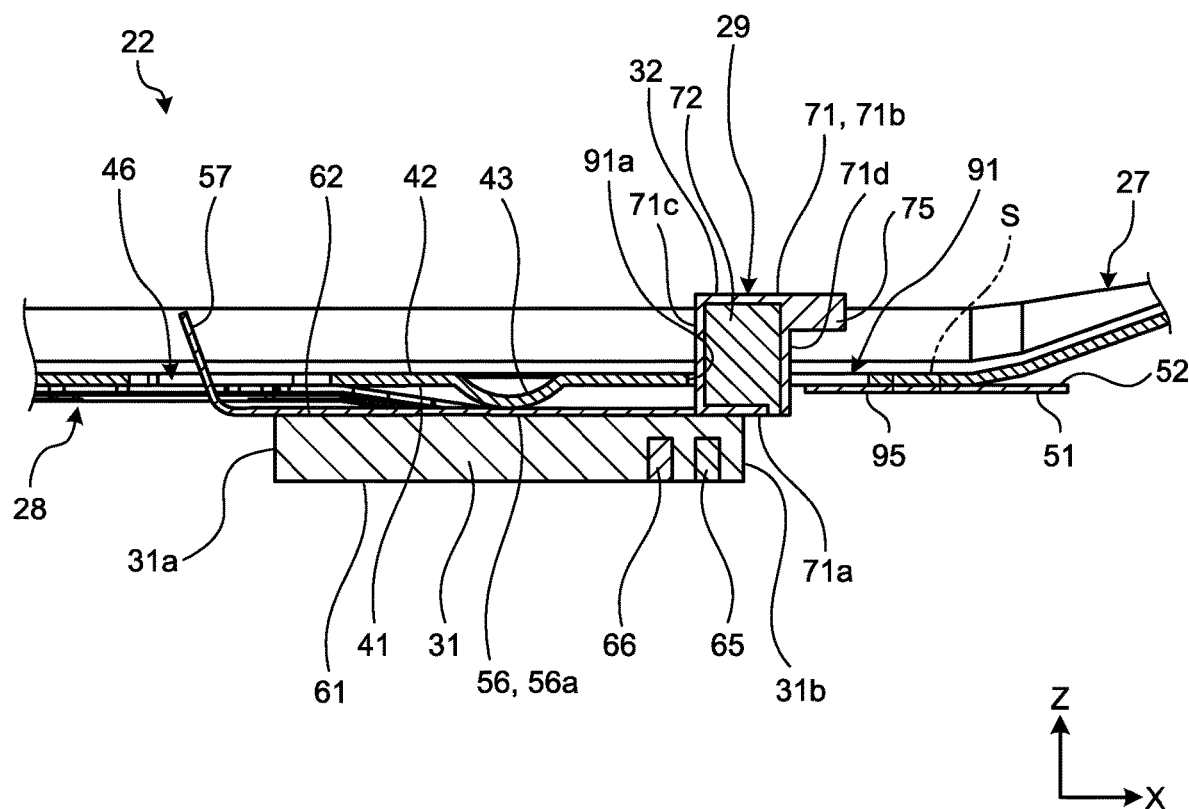
FIG. 14 is a cross-sectional view schematically illustrating a part of the HGA of the fourth embodiment.

Hereinafter, a fourth embodiment will be described with reference to FIGS. 13 and 14. FIG. 13 is a plan view schematically illustrating a part of the HGA 22 according to the fourth embodiment. FIG. 14 is a sectional view schematically illustrating a part of the HGA 22 of the fourth embodiment.

As illustrated in FIG. 13, the load beam 27 of the fourth embodiment is provided with a first through-hole 91 instead of the first through-hole 45. The first through-hole 91 penetrates the load beam 27 and opens to the lower face 41 and the upper face 42.

The flexure 28 of the fourth embodiment further includes a stationary part 95 in addition to the stationary part 55 of the first embodiment. As with the stationary part 55, the stationary part 95 is a part of the flexure 28. The stationary part 95 partially has a lower face 51 and an upper face 52.

The upper face 52 of the stationary part 95 comes in contact with the lower face 41 of the load beam 27. The stationary part 95 is fixed to the lower face 41 of the load beam 27 at a welding spot S by spot welding, for example.

The stationary parts 55 and 95 include, for example, a metal plate such as stainless steel. The stationary parts 55 and 95 have higher rigidity than the arm 56b. One of the stationary parts 55 is separated from the tongue 56a in the −X direction, as in the first embodiment. The other stationary part 95 is separated from the tongue 56a in the +X direction. That is, the tongue 56a is located between the two stationary parts 55.

In the fourth embodiment, the arm 56b serves to connect the tongue 56a and the two stationary parts 55 and 95. The elastic deformation of the arm 56b allows the tongue 56a and the head unit 29 to move with respect to the dimple 43, the load beam 27, and the two stationary parts 55 and 95.

As illustrated in FIG. 14, the laser unit 32 is attached to the mounting face 62 of the magnetic head 31 such that the laser unit 32 can pass through the first through-hole 91. The laser unit 32 is separated from the edge of the load beam 27 defining the first through-hole 91 and from the rest of the load beam 27. The first through-hole 91 exposes at least a part of the upper face 52 of the stationary part 95. The laser unit 32 is also separated from the stationary part 95.

The protrusion 75 partially covers the first through-hole 91 but does not cover the upper face 42 of the load beam 27. Furthermore, the protrusion 75 partially covers the upper face 52 of the stationary part 55 of the flexure 28 in the Z direction (substantially Z direction). The protrusion 75 may partially cover both the upper face 42 of the load beam 27 and the upper face 52 of the stationary part 55 of the flexure 28 in the Z direction.

In the +X direction (X direction), the total length of the laser unit 32 and the protrusion 75 is shorter than the distance between the stationary part 95 and an edge 91a of the first through-hole 91. The edge 91a is located at the end of the first through-hole 91 in the −X direction and extends in substantially the Y direction. The protruding direction of the protrusion 75 and the size of the first through-hole 91 are not limited to this example, and may be designed in various manners such as in the second to third embodiments. Furthermore, the HDD 10 of the fourth embodiment may include the restricting member 81 of the third embodiment instead of the protrusion 75.

In the fourth embodiment, an impact applied to the HDD 10, for example, may cause the tongue 56a and the head unit 29 to move away from the lower face 41 of the load beam 27 and the dimple 43. Along with the movement of the magnetic head 31 of the head unit 29 away from the lower face 41 by a given distance, the protrusion 75 comes in contact with the upper face 52 of the stationary part 95 of the flexure 28. Thereby, the protrusion 75 can restrict the magnetic head 31 from moving away from the lower face 41 beyond the given distance. The given distance is an exemplary first distance.

In the HDD 10 of the fourth embodiment described above, the flexure 28 includes the stationary part 95 fixed to the load beam 27; and the gimbal 56 that is connected to the stationary part 95 and is elastically movable with respect to the stationary part 95. The protrusion 75 partially covers the upper face 52 on the stationary part 95 and comes in contact with the upper face 52 of the stationary part 95 along with the movement of the magnetic head 31 away from the lower face 41 by a given distance, thereby restricting the magnetic head 31 from moving further from the lower face 41 beyond the given distance. That is, the protrusion 75 comes in contact with and is supported by the fixed portion of the flexure 28 to the load beam 27. With this configuration, the protrusion 75 can more reliably restrict the magnetic head 31 from moving away from the lower face 41 beyond a given distance, as compared with the protrusion 75 supported by the gimbal 56 of the flexure 28.

The first to fourth embodiments have described the example that the laser unit 32 includes the protrusion 75 and the restricting member 81 serving as an exemplary first restrictor. However, the first restrictor may be included in another part of the head unit 29, such as the magnetic head 31. For example, the restricting member 81 may be attached to the magnetic head 31.

The first to fourth embodiments additionally include the following technical ideas:

[1] A disk device manufacturing method including:
allowing a heat-assister attached to a magnetic head to pass through a hole opening to a first face and a second face of a load beam, the second face opposite to the first face;
moving the magnetic head in a direction in which a protrusion protrudes from the heat-assister along the first face; and
attaching the magnetic head to a flexure while the protrusion partially covers the second face.

[2] A disk device manufacturing method including:
allowing a heat-assister to pass through a hole opening to a first face and a second face of a load beam, the second face opposite to the first face;
attaching the heat-assister to a magnetic head while a protrusion that protrudes from the heat-assister along the first face partially covers the second face.

[3] A disk device manufacturing method including:
allowing a heat-assister to pass through a hole opening to a first face and a second face of a load beam, the second face opposite to the first face; and
attaching a restricting member to the heat-assister such that the restricting member partially covers the second face.

According to at least one of the first to fourth embodiments described above, the heat-assister is attached to the magnetic head for heating the magnetic disk. This increases the weight of the head unit including the magnetic head, and may make the head unit easily vibrate and move apart from the first face when the disk device receives an impact. In any of the embodiments, however, the head unit is provided with the first restrictor. If the magnetic head moves away from the first face by the first distance, the first restrictor comes in contact with at least one of the load beam and the flexure and thereby restricts the magnetic head from moving further from the first face beyond the first distance. That is, the head unit, which is likely to vibrate due to the added mass of the heat-assister, includes the first restrictor serving to restrict the head unit from vibrating beyond the first distance. This makes it possible to avoid the magnetic head from moving away from the first face beyond the given first distance in the heat assisted magnetic recording (HAMR) disk device including the heat-assister. That is, the magnetic head can be prevented from colliding with the opposing magnetic head, for example, leading to improving the impact resistance of the disk device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
a magnetic disk;
a load beam having a first face facing the magnetic disk;
a flexure attached to the first face;
a head unit including:
a magnetic head attached to the flexure, configured to read and write information from and to the magnetic disk, and
an assister attached to the magnetic head, configured to assist the magnetic head to read and write information from and to the magnetic disk; and
a first restrictor included in the head unit, configured to come in contact with at least one of the load beam and the flexure along with movement of the magnetic head away from the first face by a first distance.

2. The disk device according to claim 1, wherein
the load beam has a second face opposite the first face and is provided with a hole opening to the first face and the second face,
the flexure has a third face facing the first face,
the assister is attached to the magnetic head such that the assister passes through the hole, and
the first restrictor is included in the assister, and partially covers at least one of the second face and the third face.

3. The disk device according to claim 2, wherein
the assister comprises:
an outer shell; and
an optical device housed in the outer shell, configured to irradiate the magnetic disk with light, and
the first restrictor protrudes from the outer shell.

4. The disk device according to claim 3, wherein
the first restrictor protrudes from the outer shell in a first direction along the first face, and
in the first direction, a total length of the assister and the first restrictor is shorter than a length of the hole.

5. The disk device according to claim 3, wherein
the first restrictor protrudes from the outer shell in a first direction along the first face, and
in the first direction, a total length of the assister and the first restrictor is longer than a length of the hole, and the assister is shorter in length than the hole.

6. The disk device according to claim 2, wherein
the assister comprises:
an outer shell; and
an optical device housed in the outer shell, configured to irradiate the magnetic disk with light, and
the first restrictor is attached to the outer shell.

7. The disk device according to claim 2, wherein
the first restrictor partially covers the second face, and restricts the magnetic head from moving further from the first face beyond the first distance by coming in contact with the second face along with movement of the magnetic head away from the first face by the first distance.

8. The disk device according to claim 2, wherein
the flexure includes:
a stationary part fixed to the load beam; and
an elastic part connected to the stationary part and elastically movable with respect to the stationary part,
the magnetic head is attached to the elastic part, and
the first restrictor partially covers the third face of the stationary part, and restricts the magnetic head from moving further from the first face beyond the first distance by coming in contact with the third face of the stationary part along with movement of the magnetic head away from the first face by the first distance.

9. The disk device according to claim 1, further comprising
a carriage that is movable relative to the magnetic disk; wherein the load beam is connected to the carriage at an end in a second direction along the first face, the magnetic head has a first end in the second direction and a second end in a third direction opposite to the second direction, and the assister is attached to the magnetic head at a position closer to the second end than to the first end.

10. The disk device according to claim 9, further comprising a second restrictor included in the flexure and separated from the first restrictor in the second direction, the second restrictor restricts the magnetic head from moving further from the first face beyond a second distance by coming into contact with at least one of the load beam and the flexure along with movement of the magnetic head away from the first face by the second distance.

11. A disk device comprising:

a magnetic disk;

a load beam having a first face facing the magnetic disk, a flexure attached to the first face, a magnetic head attached to the flexure, configured to read and write information from and to the magnetic disk; and a heat-assister configured to heat the magnetic disk, the heat-assister comprising:

a base that extends in an extending direction intersecting the first face, and a protrusion that protrudes from the base in a protruding direction intersecting the extending direction and that partially covers at least one of the load beam and the flexure in the extending direction.

12. The disk device according to claim 11, wherein the load beam is provided with a hole opening to the first face, and the base passes through the hole.

13. The disk device according to claim 12, wherein of the heat-assister, a part including the protrusion has a larger cross-sectional area orthogonal to the extending direction than a part passing through the hole.

14. The disk device according to claim 11, wherein the base is attached to the magnetic head such that the base extends from the magnetic head in the extending direction.

15. A disk device comprising:

a disk;

a load beam having a first face facing the disk;

a flexure attached to the first face;

a head unit including:

a head attached to the flexure, configured to read and write information from and to the disk, and a heat-assister attached to the head, configured to heat the disk; and a restrictor included in the head unit, configured to come in contact with at least one of the load beam and the flexure along with movement of the head away from the first face by a first distance.

\* \* \* \* \*